US010753725B2

(12) United States Patent
Seitz et al.

(10) Patent No.: US 10,753,725 B2
(45) Date of Patent: Aug. 25, 2020

(54) MEASURING APPARATUS AND METHOD FOR CONTROLLING THE ILLUMINATION FOR A MEASURING APPARATUS

(71) Applicant: Carl Zeiss Industrielle Messtechnik GmbH, Oberkochen (DE)

(72) Inventors: Dominik Seitz, Schwaebisch Gmuend (DE); Nils Haverkamp, Aalen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 65 days.

(21) Appl. No.: 15/478,796

(22) Filed: Apr. 4, 2017

(65) Prior Publication Data

US 2017/0292829 A1    Oct. 12, 2017

(30) Foreign Application Priority Data

Apr. 7, 2016    (DE) .................. 10 2016 106 374

(51) Int. Cl.
*G06T 7/11*    (2017.01)
*G01B 11/00*    (2006.01)
(Continued)

(52) U.S. Cl.
CPC ............. *G01B 11/005* (2013.01); *G06T 7/11* (2017.01); *H04N 5/2256* (2013.01);
(Continued)

(58) Field of Classification Search
None
See application file for complete search history.

(56) References Cited

U.S. PATENT DOCUMENTS 9,194,810 B2    11/2015  Schleith et al.
9,350,921 B2    5/2016   Delaney et al.
(Continued)

FOREIGN PATENT DOCUMENTS

DE    10 2007 034 689 A1    1/2009
DE    10 2007 037 812 A1    2/2009
(Continued)

OTHER PUBLICATIONS

Garasoft Industrial LED Technology, "The Practical Use of LED Light Controllers within Machine Vision systems", 2015. (Year: 2015).*

(Continued)

*Primary Examiner* — William C Vaughn, Jr.
*Assistant Examiner* — Joseph Daniel A Towe
(74) *Attorney, Agent, or Firm* — Harness, Dickey & Pierce, P.L.C.

(57) ABSTRACT

A measuring apparatus includes first and second optical sensors for recording an image in an image capturing region during first and second image recording time periods, respectively. First and second control signal transducers provide first and second control signals, respectively, that represent the first and second image recording time periods, respectively. A control device controls a measurement illumination arrangement during the first image recording time period based on the first control signal and a first measurement illumination setting. The control device controls the measurement illumination arrangement during the second image recording time period based on the second control signal and a second measurement illumination setting. The second optical sensor is series connected to the first control signal transducer via a timing member. The first control signal is supplied to the timing member so that the second
(Continued)

optical sensor is triggered by the first optical sensor via the timing member.

16 Claims, 6 Drawing Sheets

(51) Int. Cl.
    *H04N 7/18*       (2006.01)
    *H04N 5/225*     (2006.01)
    *H05B 47/16*     (2020.01)
    *H05B 47/105*    (2020.01)

(52) U.S. Cl.
    CPC ........... *H04N 7/181* (2013.01); *H05B 47/105* (2020.01); *H05B 47/16* (2020.01)

(56) References Cited

U.S. PATENT DOCUMENTS

| | | | |
|---|---|---|---|
| 9,417,123 B2 | 8/2016 | Yoshida et al. | |
| 2003/0133018 A1* | 7/2003 | Ziemkowski | H04N 5/2256 348/211.2 |
| 2009/0079972 A1 | 3/2009 | Schleith et al. | |
| 2015/0222801 A1* | 8/2015 | Kresser | G03B 17/54 348/362 |

FOREIGN PATENT DOCUMENTS

| | | | |
|---|---|---|---|
| DE | 10 2008 048 776 A1 | 3/2010 | |
| DE | 102008048776 A1 * | 3/2010 | ......... G05B 19/4097 |
| DE | 10 2014 208 424 A1 | 11/2014 | |
| DE | 10 2014 209 471 A1 | 12/2014 | |
| EP | 2 078 923 A1 | 7/2009 | |
| WO | 2009/007130 A1 | 1/2009 | |
| WO | 2015/097476 A2 | 7/2015 | |
| WO | WO-2015097476 A2 * | 7/2015 | ......... H05B 33/0845 |

OTHER PUBLICATIONS

Gardasoft Industrial LED Technology, "The Practical Use of LED Light Controllers within Machine Vision systems", 2015. (Year: 2015).*
German Examination Report (English langauge translation attached); dated Nov. 25, 2016; 16 pp.
Praktischer Einsatz von LED-Beleuchtungssteuerungen in Bildverarbeitungssystemen; Gardasoft Industrial LED technology; 2014; 15 pp.
https://www.zeiss.com/metrology/products/systems/process-control-and-inspection/surfmax.html.
https://www.youtube.com/watch?v=HGre9h8KauU.

* cited by examiner

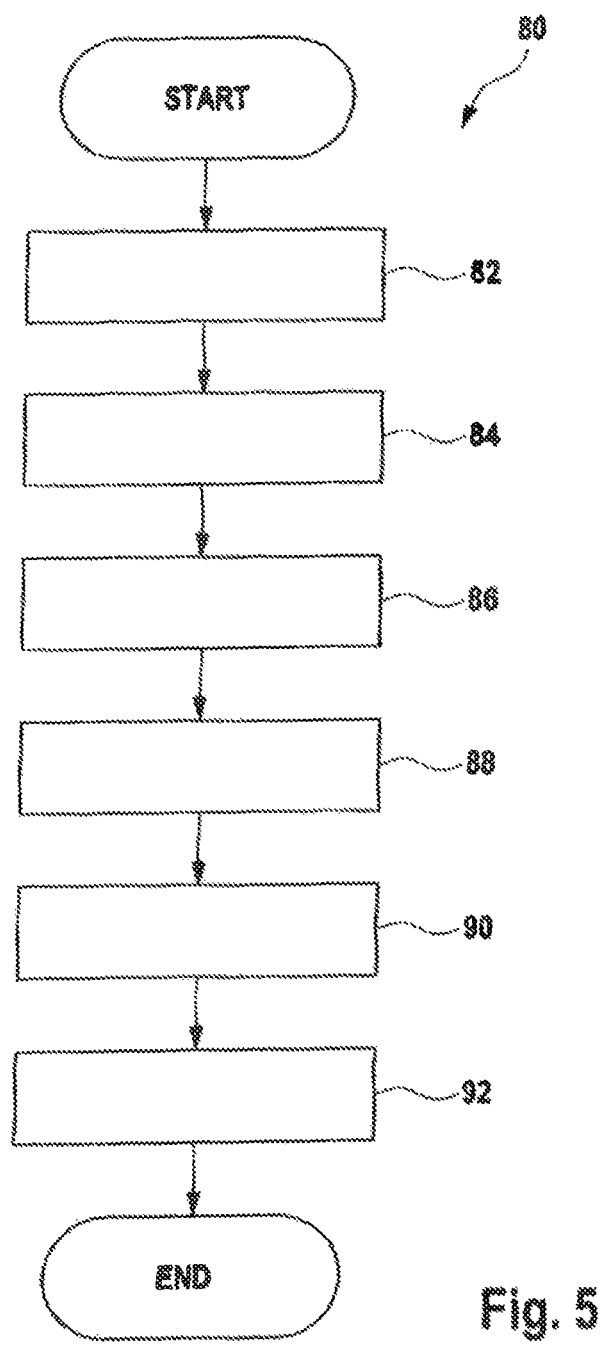

MEASURING APPARATUS AND METHOD FOR CONTROLLING THE ILLUMINATION FOR A MEASURING APPARATUS

CROSS-REFERENCE TO RELATED APPLICATIONS

This application claims the priority of German patent application DE 10 2016 106 374.6, filed Apr. 7, 2016, which is herein incorporated by reference in its entirety.

BACKGROUND OF THE INVENTION

The present invention relates to a measuring apparatus, in particular a coordinate measuring machine, comprising a first optical sensor for recording an image in an image capturing region during a first image recording time period, a first control signal transducer which provides a first control signal representing the first image recording time period, a measurement illumination arrangement for illuminating the image capturing region, a second optical sensor for recording an image in the image capturing region during a second image recording time period outside of the first image recording time period with regard to time, a second control signal transducer providing a second control signal representing the second image recording time period and comprising a control device.

The present invention further relates to a method for controlling the illumination for a measuring apparatus comprising at least two optical sensors for recording an image in an image capturing region.

Coordinate measuring machines are generally known in the prior art. They serve for checking workpieces, for example as part of quality assurance, or for ascertaining the geometry of a workpiece completely as part of what is known as "reverse engineering". Moreover, multifarious further application possibilities are conceivable.

In coordinate measuring machines of this type, different types of sensors may be used to capture the coordinates of a workpiece to be measured. By way of example, sensors that measure in tactile fashion are known in this respect, as are sold, for example, by the applicant under the name "VAST", "Vast XT" or "VAST XXT". Here, the surface of the workpiece to be measured is probed with a stylus, the coordinates of said stylus in the measurement space being known at all times. Such a stylus may also be moved along the surface of a workpiece, and so a multiplicity of measurement points may be captured at set time intervals during such a measuring process within the scope of a so-called "scanning method".

It is moreover known to use optical sensors that facilitate contactless capturing of the coordinates of a workpiece. One example of such an optical sensor is the optical sensor sold by the applicant under the name "ViScan".

The sensors may then be used in different types of measurement constructions. One example of such a measurement construction is the product "O-Inspect" by the applicant. In an apparatus of this type, both an optical sensor and a tactile sensor are used to carry out various examination tasks on a machine and ideally with a single setup of a workpiece to be measured.

Sensor systems comprising optical sensors are becoming increasingly more important in coordinate metrology. Here, optical sensors are distinguished, in particular, by a high speed of the measuring process. In this way it is possible to carry out many examination tasks, for example in medical engineering, plastics technology, electronics and precision engineering. Various other constructions are, of course, also conceivable.

Conventionally, the optical sensor head or the optical sensor is connected to a carrier system which supports and moves the optical sensor system. Various carrier systems are known from the prior art, for example portal systems, stand systems, horizontal arm systems and arm systems, and all types of robotic systems. Here, the carrier systems may moreover comprise system components which facilitate a positioning of the sensor head which is as flexible as possible. An example for this is the articulation from the applicant sold under the name "RDS". Moreover, various adapters for connecting the various system components of the carrier system among themselves and with the sensor system may be provided.

Moreover, it is conventional in coordinate metrology that work may be conducted with different types of illumination when measuring objects. By way of example, provision may be made of reflected light illumination which, for example, may be configured as bright field illumination or dark field illumination. The corresponding optical sensors then comprise a video camera and/or an image camera and appropriate illumination for the workpiece. Moreover, a fixed imaging optical unit is usually provided, said fixed imaging optical unit imaging the workpiece to be measured onto the camera or the optical sensors of the camera. Here, in general, provision is made of specific optical sensors comprising fixedly integrated illuminations and imaging optical units for each application or each type of measurement.

Moreover, the present invention may also find use in other measuring apparatuses, for example microscopes.

When optical measuring apparatuses are used, a user wishes to image the current measurement region or the region captured by the camera, the so-called ROI (region of interest), in the case of individual part examinations. In so doing, the ROI is visualized onto the workpiece to be measured. In the case of optical measuring apparatuses with a plurality of cameras and a single unchanging illumination for individual cameras, the ROI may either be overexposed or not properly illuminated, or dazzling effects may occur for certain camera positions, which may lead to erroneous measurements. In order to obtain an ideal measurement, different illumination settings are therefore required for the different cameras.

Various illumination control methods for optical measuring apparatuses have already been proposed in the prior art; by way of example, document DE 10 2014 208 424 A1 has proposed a method for setting the illumination of an image measuring apparatus, in which a relationship between a brightness guidance value and a current value corresponding to a brightness is calculated on the basis of a previously present relationship between a current flowing through a light-emitting device and the brightness, said method comprising the steps of creating a calibration table containing the brightness guidance value, the current value and the brightness, calculating a required brightness during a measurement, calculating a brightness guidance value corresponding to the required brightness and setting the brightness guidance value using the calibration table.

Moreover, document EP 2 078 923 A1 proposed an image measuring device comprising a camera, which ascertains images of a plurality of measurement points on the basis of a pre-set measurement procedure, and an illumination unit, which illuminates the measurement points.

Moreover, document DE 10 2014 209 471 A1 exhibits a method for controlling a part for generating a structured illumination pattern in order to illuminate a workpiece during image capturing by a camera in a specification image processing inspection system.

Under the name "Surf Max", the applicant distributes a measuring system for scanning the surface of an object, wherein the system switches between a multitude of illuminations based on a varying position of the object. Similar measuring systems are shown in documents DE 10 2007 034 689 A1 and WO 2009/007130 A1.

Under the names "ABIS" and "ABIS II", there is sold a measuring machine for measuring an object that switches between a multitude of illuminations. A similar measuring system is shown in documents DE 10 2007 037 812 A1 and US 2009 079 972 A1.

However, there remains a need for a measuring apparatus and a method for controlling the illumination for a measuring apparatus, which remove the disadvantages described above. It is therefore an object of the present invention to specify an improved method for controlling the illumination and a measuring apparatus, in particular a coordinate measuring machine, comprising at least two optical sensors, which provides an improved illumination of an image capturing region.

SUMMARY OF THE INVENTION

According to a first aspect of the invention, there is provided a measuring apparatus comprising a first optical sensor for recording an image in an image capturing region during a first image recording time period, a first control signal transducer which provides a first control signal representing the first image recording time period, a measurement illumination arrangement for illuminating the image capturing region, a second optical sensor for recording an image in the image capturing region during a second image recording time period outside of the first image recording time period with regard to time, a second control signal transducer providing a second control signal representing the second image recording time period and comprising a control device, wherein the control device is embodied to control the measurement illumination arrangement during the first image recording time period in a manner dependent on the first control signal in accordance with a first measurement illumination setting and control the measurement illumination arrangement during the second image recording time period in a manner dependent on the second control signal in accordance with a second measurement illumination setting.

According to a second aspect of the invention, there is provided a method for controlling the illumination for a measuring apparatus comprising at least two optical sensors for recording an image in an image capturing region, said method comprising the following steps:

setting a first image recording time period, during which images are recorded in the image capturing region by means of a first optical sensor;

providing a first control signal representing the first image recording time period;

illuminating the image capturing region using a measurement illumination arrangement of the measuring apparatus during the first image recording time period in accordance with a first measurement illumination setting in a manner dependent on the first control signal;

setting a second image recording time period, during which images are recorded in the image capturing region by means of a second optical sensor;

providing a second control signal representing the second image recording time period; and illuminating the image capturing region using the measurement illumination arrangement of the measuring apparatus during the second image recording time period in accordance with a second measurement illumination setting depending on the second control signal.

Optical sensors, in particular cameras, which are used in optical metrology offer the option of displaying the current status of the image acquisition by way of so-called "triggers". Below, such a "trigger" is also referred to as control signal transducer. Hence, a subsequent system or the electronics or the control device of the measuring apparatus knows whether an image is currently being recorded by means of the respective optical sensor. The status of the shutter or a stop is captured and hence whether or not light is collected by means of the optical sensor is forwarded. In this way, the measurement illumination arrangement is controlled in such a way that an ideal measurement illumination may be provided in each case for the respective optical sensor.

The invention uses this principle of switching the illumination arrangement in a manner dependent on the control signal for the purposes of controlling the light sources or the illumination arrangement which illuminates the image capturing region during the respective image capturing time period of the optical sensor such that light may be collected from the optical sensor to which the illumination arrangement is assigned, i.e. an image may be recorded. An ideal measurement illumination for each one of the optical sensors may be provided if an illumination setting which is set to be ideal for the position of the respective optical sensor is in each case assigned to each one of the optical sensors for the purposes of illuminating the image capturing region. As a result, the influence of overdriving or incorrect illumination or dazzling effects in the case of optical measuring systems with a plurality of optical sensors may be minimized, and so an ideal optical measurement may be provided.

In accordance with the present invention, the measurement illumination settings may be different settings of one light source or different settings of a plurality of light sources.

According to a third aspect of the invention, there is provided a computer program product comprising a computer program having program code for carrying out a method according to the second aspect of the invention or one of its refinements, when the computer program is executed on a measuring apparatus.

In a refinement of the measuring apparatus, provision may be made for the measurement illumination arrangement to comprise an individual measurement illumination, wherein the control device is embodied to control the individual measurement illumination in accordance with the first measurement illumination setting and second measurement illumination setting.

Hence, the individual measurement illumination for recording the images is controlled differently by means of the different image sensors such that the individual measurement illumination may be obtained with little technical outlay.

In a refinement of the measuring apparatus, provision may be made for the measurement illumination arrangement to comprise a first measurement illumination and a second measurement illumination, wherein the control device is embodied to switch on the first measurement illumination during the first measurement illumination setting and switch on the second measurement illumination during the second measurement illumination setting.

The first measurement illumination and the second measurement illumination are therefore switched on during the respective measurement illumination setting for the purposes of illuminating the image capturing region. This allows an ideal illumination of the image capturing region to be obtained.

In a refinement of the measuring apparatus, provision may be made for the control device to be embodied to switch off the first measurement illumination at least during the second image recording time period with regard to time and switch off the second measurement illumination at least during the first image recording time period with regard to time.

Hence, the measurement illuminations are accordingly switched off, provided the optical sensor correspondingly assigned to the respective other measurement illumination is capturing an image from the image capturing region. As a result, it is possible to avoid bothersome light effects from the measurement illumination which correspondingly is not aligned or set in an ideal manner.

In a further refinement of the measuring apparatus, provision may be made for the control device to be embodied to switch off the first measurement illumination outside of the first image recording time period with regard to time and switch off the second measurement illumination outside of the second image recording time period with regard to time.

Hence, the respective measurement illumination is only switched on during the image recording time period if the correspondingly assigned optical sensor captures an image of the image capturing region. As a result, the image capturing region is only illuminated by the correspondingly assigned measurement illumination during the respective image recording time period, and so it is possible to provide ideal illumination for the respective optical sensor.

In a further refinement of the measuring apparatus, provision may be made for the first control signal transducer to control the first measurement illumination and for the second control signal transducer to control the second measurement illumination.

This renders it possible to ensure that the respective measurement illumination arrangement, which is assigned to the respective optical sensor and which is set and aligned to the optical sensor, is switched on when the respective optical sensor performs image recording.

In a refinement of the measuring apparatus, provision may be made for the second optical sensor to be connected to the first control signal transducer via a timing member for the purposes of controlling the image recording of the second optical sensor with regard to time. Here, preferably, a retardation member is connected between the first control signal transducer and the second optical sensor such that the first control signal from the first control signal transducer both controls the first measurement illumination arrangement and, with a corresponding time offset, controls the image recording by the second optical sensor. By way of this principle of a series connection, the measuring apparatus may be extended to a multiplicity of cameras, wherein all that needs to be ensured is that the integration times of the cameras and the switching-on time of the measurement illumination arrangements do not overlap. As a result, a reliable controller of the optical sensors may be realized with little technical outlay.

In a refinement of the measuring apparatus, provision may be made for the measuring apparatus to comprise a third optical sensor for recording an image in the image capturing region during a third image recording time period outside of the first image recording time period and the second image recording time period with regard to time, comprising a third control signal transducer which provides a third control signal representing the third image recording time period and controls the measurement illumination arrangement for illuminating the image capturing region, wherein the third optical sensor is connected to the second control signal transducer by a timing member for the purposes of controlling the image recording of the third optical sensor with regard to time.

As a result, it is possible to provide a series connection of three optical sensors with a correspondingly assigned measurement illumination such that three different image recordings may be carried out with an ideal illumination and, accordingly, ideal image capturing may be provided.

In a refinement of the measuring apparatus, provision may be made for the control device furthermore to be embodied to switch on at least one further illumination arrangement outside of the image recording time periods with regard to time in a manner dependent on at least one of the control signals.

A further illumination which does not contribute to the measurement illumination of the image capturing region may thus be provided such that, for example, the measurement arrangement is sufficiently illuminated for the user and, at the same time, recording an image is not adversely affected. By way of example, a corresponding ambient illumination arrangement may serve to illuminate the complete working region of the machine for the user in the otherwise e.g. darkened room, in which the measuring apparatus is arranged, in order thus to grant a view of the workpiece, further sensors such as tactile sensors and the entire remaining construction.

In a further refinement, provision may be made for the further illumination arrangement to be a marking illumination device for marking the image capturing region.

In this way, the image capturing region may be marked, for example by means of a laser or a laser pointer. As a rule, on account of the good visibility, a laser is particularly suitable for marking the image capturing region on all types of workpieces. As a result, the corresponding setting of the image capturing region is possible with little technical outlay, without the marking illumination influencing the capturing of images by the optical sensors.

In a particular refinement of the method, provision may be made for an individual measurement illumination of the measurement illumination arrangement to be controlled in accordance with the first measurement illumination setting and the second measurement illumination setting.

Hence, the individual measurement illumination for recording the images is controlled differently by means of the different image sensors such that the individual measurement illumination may be obtained with little technical outlay.

In a particular refinement of the method, provision may be made for a first measurement illumination of the measurement illumination arrangement to be switched on during the first measurement illumination setting and a second measurement illumination to be switched on during the second measurement illumination setting.

The first measurement illumination and the second measurement illumination are therefore switched on during the respective measurement illumination setting for the purposes of illuminating the image capturing region. This allows an ideal illumination of the image capturing region to be obtained.

In a particular refinement of the method, provision may be made for the first measurement illumination arrangement to be switched off outside of the first image recording time period and the second measurement illumination arrangement to be switched off outside of the second image recording time period.

As a result, it is possible to reliably ensure that the respective measurement illumination arrangement does not optically disturb any image recording by another optical sensor such that it is always possible to provide an ideal illumination of the image capturing region.

In a refinement of the method, provision may be made for the second image recording time period to start offset by a first time interval after the end of the first image recording time period.

As a result, it is possible to reliably ensure that the periods of time in which the measurement illumination arrangements illuminate the image capturing region do not overlap.

In a refinement of the method, provision may be made for the sum of the image recording time periods to be less than a period length of a refresh of the measuring apparatus.

This ensures that all optical sensors record an image within a refresh period of the measuring apparatus.

In a refinement of the method, provision may be made for the image capturing region to be illuminated by a further illumination arrangement outside of the first image recording time period and the second image recording time period with regard to time, and for illumination by the further illumination arrangement to start offset with regard to time after an end of one of the image recording time periods and end before a start of a further image recording time period.

As a result, the image capturing region may be illuminated for the user outside of the image recording time periods such that it is possible to provide the user with an improved view of the workpiece and, in particular, a marking illumination without impairment of the image recording by the optical sensors during the different image recording time periods.

Overall, the measuring apparatus according to the invention and the method according to the invention may provide an ideal illumination for different optical sensors, wherein it is possible to reliably avoid measurement errors as a result of overdriving or a poor illumination or dazzling effects.

It is understood that the aforementioned features and those yet to be explained below may be used not only in the respectively specified combination but also in other combinations or on their own, without departing from the scope of the present invention.

BRIEF DESCRIPTION OF THE DRAWINGS

Illustrative embodiments of the invention are shown in the drawing and are explained in greater detail in the following description. In the figures:

FIG. 5 shows a schematic flowchart of a method for controlling the illumination of a measuring apparatus;

DETAILED DESCRIPTION OF THE INVENTION

Figure 1:
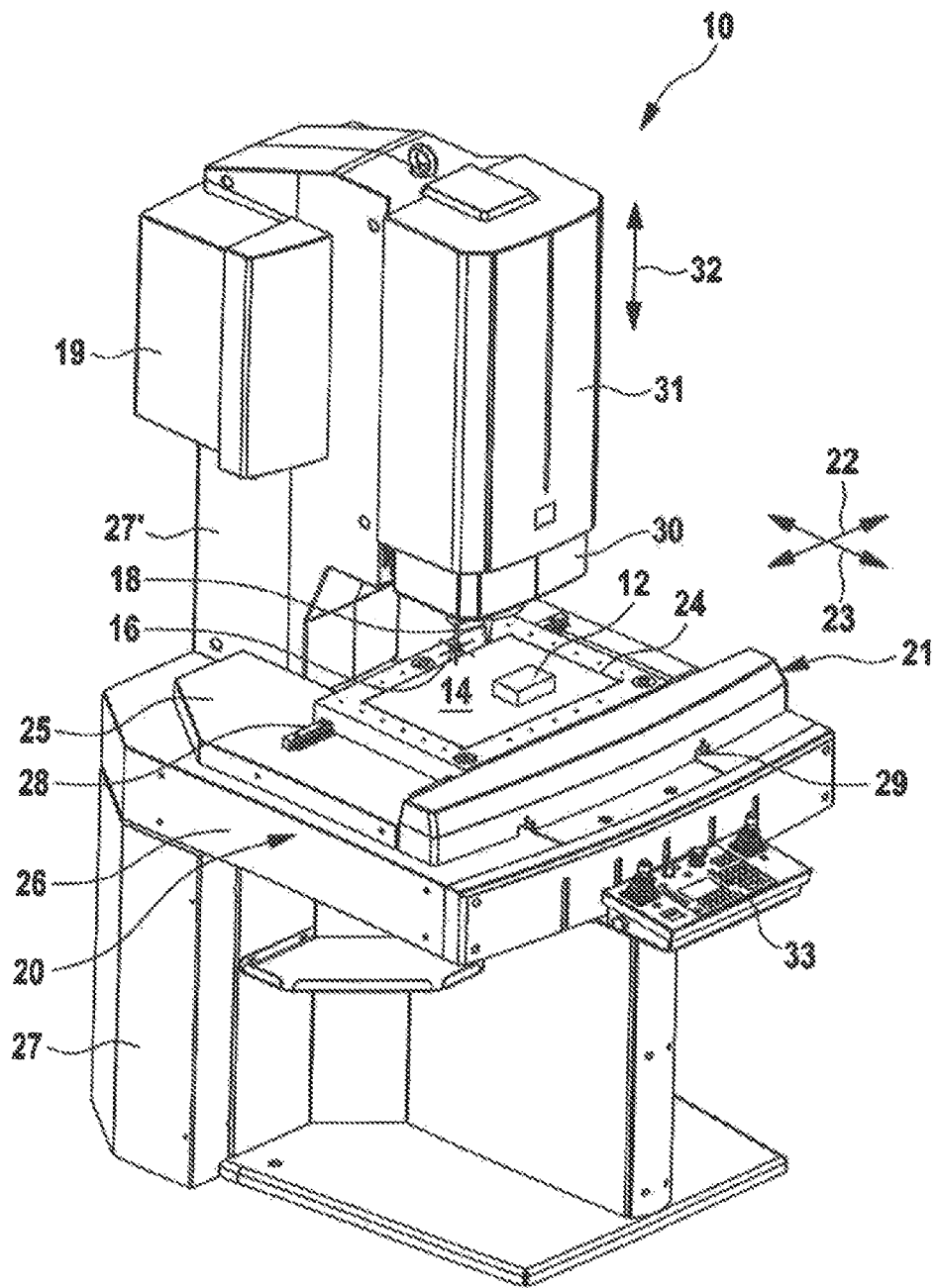
FIG. 1 shows a schematic illustration of a measuring apparatus.

FIG. 1 shows a measuring apparatus 10 for inspecting an object 12 to be measured, said object being arranged on a workpiece holder 14. The measuring apparatus 10 is a coordinate measuring machine in the depicted embodiment. The object 12 to be measured is measured by means of a plurality of optical sensors 18. Optionally, one or more tactile sensors 16 may additionally be provided.

Coordinate measuring machines are generally known in the prior art. They serve for checking workpieces, for example as part of quality assurance, or for ascertaining the geometry of a workpiece completely as part of what is known as "reverse engineering". Moreover, multifaceted further options for application are conceivable, for example also the additional use for inspecting surfaces.

In coordinate measuring machines of this type, different types of sensors may be used to capture the coordinates of a workpiece to be measured. By way of example, sensors that measure in tactile fashion are known in this respect, as are sold, for example, by the applicant under the name "VAST", "Vast XT" or "VAST XXT". Here, the surface of the workpiece to be measured is probed with a stylus, the coordinates of said stylus in the measurement space being known at all times. Such a stylus may also be moved along the surface of a workpiece, and so a multiplicity of measurement points may be captured at set time intervals during such a measuring process within the scope of a so-called "scanning method".

It is moreover known to use optical sensors that facilitate contactless capturing of the coordinates of a workpiece. One example of such an optical sensor is the optical sensor sold by the applicant under the name "ViScan".

The sensors may then be used in different types of measurement constructions. An example of such a measurement construction is a table construction, as shown in FIG. 1. One example of such a table construction is the product "O-Inspect" by the applicant. In an apparatus of this type, both an optical sensor and a tactile sensor are used to carry out various examination tasks on a machine and ideally with a single setup of a workpiece to be measured. In this way it is easily possible to carry out many examination tasks, for example in medical engineering, plastics technology, electronics and precision engineering. Various other constructions are, of course, also conceivable.

Such sensor systems or sensor heads, which carry both tactile sensors and optical sensors, find increasing importance in coordinate metrology. A combination of tactile and optical sensors facilitates combining the advantages of the high accuracy of a tactile measurement system with the speed of an optical measurement system in a single coordinate measuring machine. Moreover, calibration processes when changing the sensors are avoided, just like possible setting up of a workpiece.

Conventionally, the sensor head, which may also be referred to as a sensor system, is connected to a carrier system which supports and moves the sensor system. The prior art has disclosed various carrier systems, for example portal systems, stand systems, horizontal arm systems and arm systems, all types of robotic systems and ultimately closed CT systems in the case of sensor systems operating with x-rays. Here, the carrier systems may moreover comprise system components which facilitate a positioning of the sensor head which is as flexible as possible. An example for this is the articulation from the applicant sold under the name "RDS". Moreover, various adapters for connecting the various system components of the carrier system among themselves and with the sensor system may be provided.

The use of the measuring apparatus 10 is therefore not restricted to the table construction, depicted in FIG. 1, and the corresponding carrier system, but, instead, it may also be used with all other types of carrier system. Furthermore, the measuring apparatus 10 may also find use, in general, in multi-sensor measurement systems, or else in a material microscope.

The measuring apparatus 10 furthermore comprises a measuring table 20. Situated on the measuring table 20 is a positioning device 21. It is provided, in particular, to position the object 12 to be measured parallel to an X-axis 22 and to a Y-axis 23. Here, the X-axis 22 and the Y-axis 23 span a measurement plane.

By way of example, an X-table 24 and a Y-table 25 may be provided for positioning purposes. The X-table 24 is movable parallel to the X-axis 21 and the Y-table 25 is movable parallel to the Y-axis 22. Both are arranged on a base plate 26. The base plate 54 is carried by a machine frame 27 and 27'.

The movement of the X-table 24 and of the Y-table 25 is guided by linear guides in the X-direction 28 and by linear guides in the Y-direction 29. This construction corresponds to the so-called "table construction". As explained above, other carrier systems are also conceivable.

The measuring apparatus 10 furthermore comprises a measuring head 15. One or more tactile sensors 16 may be arranged on the measuring head 15. Furthermore, the measuring apparatus 10 is arranged on the measuring head 15. Moreover, one or more further optical sensors 18 may also be arranged at or in the measuring head 16. Thus, the measuring head 15 serves to couple the one or more optical sensors 18 and, possibly, a tactile sensor 16 with a carrier structure, for example a Z-carriage 30. The measuring head 15 may be a closed housing construction, but it may also have an open embodiment. By way of example, the measuring head 15 may also have the form of a simple plate, on which the one or more optical sensors 18, and possibly the tactile sensor 16, are fastened. Moreover, all further possible forms for coupling the one or more optical sensors 18, and possibly the tactile sensor 16, with the carrier structure are also conceivable.

The measuring head 15 is held on the Z-carriage 30 which is guided in a carriage housing 31 parallel to a Z-axis 32. This Z-axis 32 is perpendicular to the X-axis 22 and the Y-axis 23. The X-axis 22, the Y-axis 23 and the Z-axis 32 therefore form a Cartesian coordinate system.

The measuring apparatus 10 furthermore comprises a control console 33. It is possible to actuate the individual elements of the measuring apparatus 10 by way of the control console 33. Moreover, it is possible to predetermine inputs to the measuring apparatus 10. In principle, provision may also be made for a display apparatus (not depicted here) to be arranged in the control console 33 or at a different location for the purposes of directing measurement value outputs to a user of the measuring apparatus 10. A control device 19 serves to control or regulate the measuring apparatus 10. In principle, the control device may also be arranged separately and/or at a distance from the measuring apparatus 10.

Figure 2:
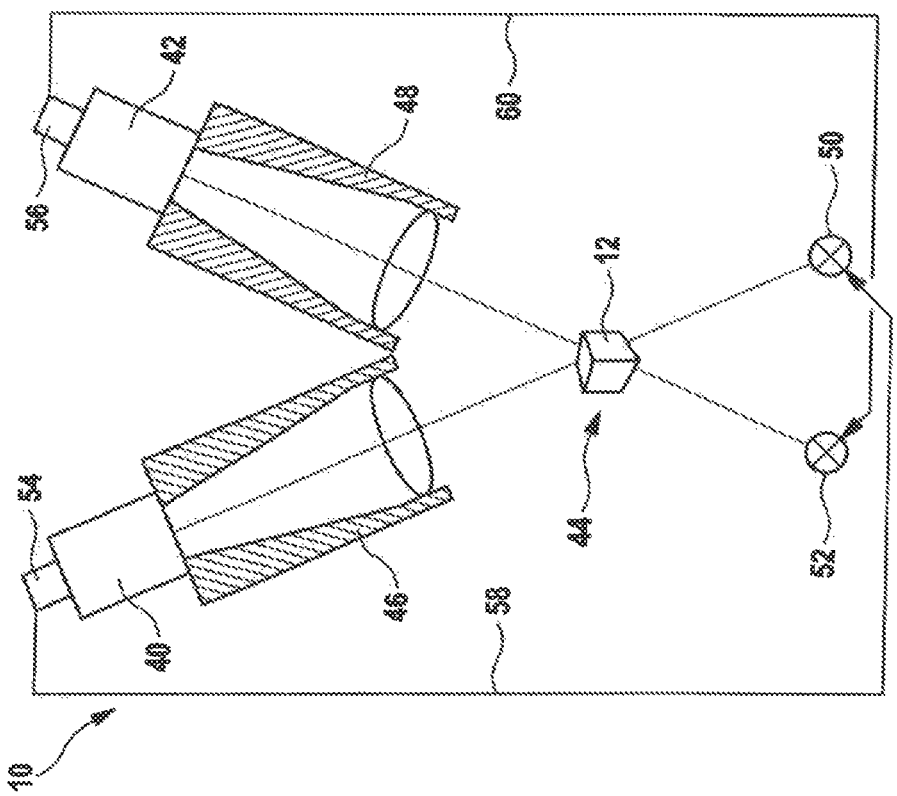
FIG. 2 shows an embodiment of a measuring apparatus comprising a plurality of optical sensors.

FIG. 2 shows an embodiment of the measuring apparatus 10 comprising two optical sensors, a first optical sensor 40 and a second optical sensor 42, wherein the optical sensors 40, 42 optically capture the object 12 to be measured in a common image capturing region 44 and in each case record images of the object 12 to be measured in the image capturing region 44. The embodiment of the measuring apparatus 10 from FIG. 2 forms an optical stereoscope, wherein a stereoscopic measurement of the object 12 to be measured is possible as a result of recording an image from different directions by way of the optical sensors 40, 42. The optical sensors 40, 42 each have an optical unit 46, 48 for the purposes of appropriately imaging the object 12 to be measured.

Further, the measuring apparatus 10 comprises a first measurement illumination 50 and a second measurement illumination 52 which, together, form a measurement illumination arrangement and illuminate the image capturing region 44 and, correspondingly, the object 12 to be measured. The measurement illuminations 50, 52 are arranged in accordance with the alignment of the optical sensors 40, 42 in order to illuminate the image recording of the respective optical sensors 40, 42 in an ideal individual fashion and, accordingly, facilitate ideal image recording. In the embodiment depicted in FIG. 2, the first measurement illumination 50 illuminates the image capturing region 44 and the object 12 to be measured for recording an image by means of the first optical sensor 40 in a first measurement illumination setting and the second measurement illumination 52 illuminates the image capturing region 44 and the object 12 to be measured for recording by means of the second optical sensor 42 in a second measurement illumination setting.

Recording an image by way of the first optical sensor 40 and recording an image by way of the second optical sensor 42 is carried out in succession, i.e. not at the same time, wherein the measurement illuminations 50, 52 are controlled in such a way in accordance with the assignment thereof to the optical sensors 40, 42 that the image capturing region 44 or the object 12 to be measured is only illuminated by the correspondingly assigned measurement illumination 50, 52 during the image recording by the respectively assigned optical sensor 40, 42.

A control signal transducer 54, 56 is in each case assigned to the optical sensors 40, 42, said control signal transducers providing a control signal 58, 60 representing an image recording time period of the respective optical sensor 40, 42, with the control signal 58 of the first control signal transducer 54 switching the first measurement illumination 50 on during the image recording time period of the first optical sensor 40 and the control signal 60 of the second control signal transducer 56 switching the second measurement illumination 52 on during the second image recording time period of the second optical sensor 42. This ensures that the image capturing region 44 and the object 12 to be measured are in each case illuminated correspondingly ideally during the image recording time periods of the respective optical sensors 40, 42.

Figure 3:
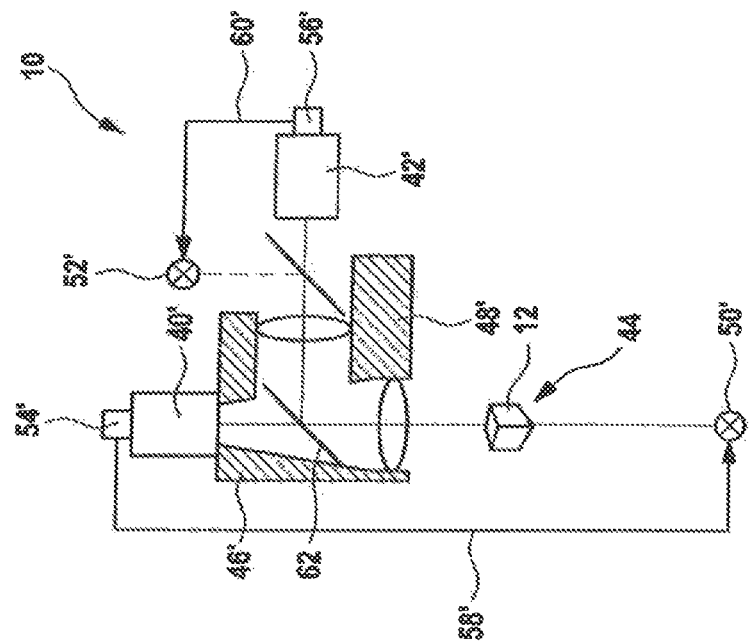
FIG. 3 shows a further embodiment of a measuring apparatus comprising a plurality of optical sensors.

FIG. 3 schematically illustrates a further embodiment of the measuring apparatus 10. The embodiment of the measuring apparatus 10 from FIG. 3 serves to measure the distance using an autofocus and comprises the two optical sensors 40', 42' which record the image capturing region 44 and the object 12 to be measured which is arranged therein from the same direction of view by way of a semitransparent mirror 62.

The measurement illuminations 50', 52' accordingly illuminate the image capturing region 44 and the object 12 to be measured with a correspondingly ideally adapted brightness in order to illuminate the object 12 to be measured in accordance with the requirements of the optical sensors 40',

42'. In this distance measurement with an autofocus, the optical sensor 40' forms the measuring camera and the optical sensor 42' forms the autofocus camera, with the measurement illumination 50' illuminating the object 12 to be measured for the purposes of the measurement by means of the measuring camera 40' and the measurement illumination 52' forming the autofocus illumination and accordingly illuminating the image capturing region 44 for the autofocus camera 42'.

The control signal transducer 54' produces the control signal 58' which switches on the first measurement illumination 50' during the image recording by the first optical sensor 40'. The second control signal transducer 56' accordingly controls the autofocus illumination 52' and accordingly switches on the autofocus illumination 52' during the image recording by the autofocus camera 56'.

As a result of the alternating illumination of the image capturing region 44 by the measuring camera 40' and the autofocus camera 42' in accordance with the image recording by the first optical sensor 40' and the second optical sensor 42', respectively, it is possible to obtain an ideal illumination of the object 12 to be measured and bothersome effects, such as e.g. dazzling effects, may be avoided.

Figure 4A:
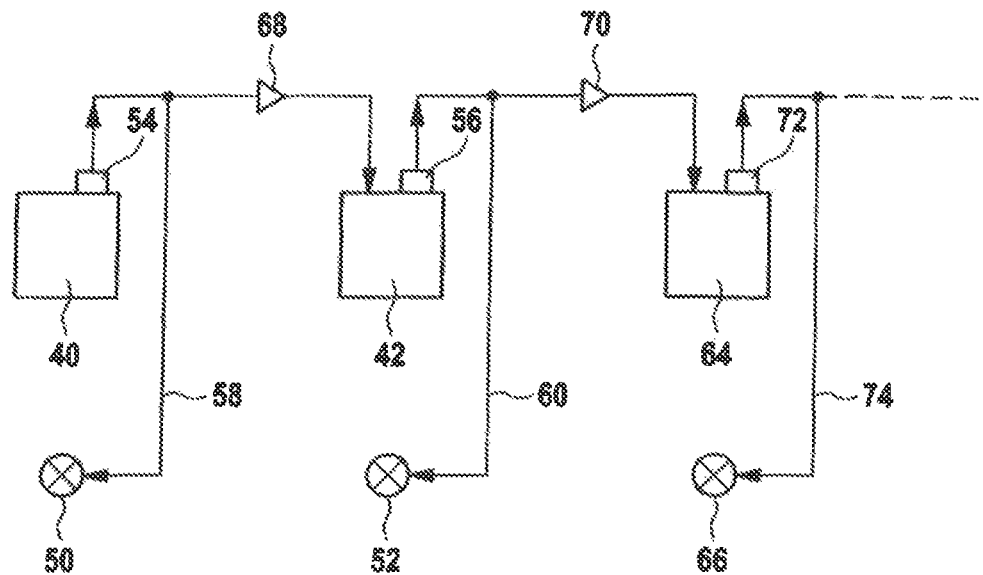
FIGS. 4a-c show schematic illustrations of series connections of optical sensors and measurement illumination arrangements in different embodiments.

FIG. 4a depicts a schematic illustration of a control device for controlling the optical sensors and the measurement illuminations.

In the embodiment depicted here, the measuring apparatus 10 comprises the first optical sensor 40 and the second optical sensor 42, as well as a third optical sensor 64, with the image capturing region 44 and the object 12 to be measured being illuminated accordingly by the first measurement illumination 50, the second measurement illumination 52 and a third measurement illumination 66 during the respective image recording by the correspondingly assigned optical sensors 40, 42, 64.

The first control signal transducer 54, which is assigned to the first optical sensor 40, provides the first control signal 58 which accordingly switches on the first measurement illumination 50 during the image recording by the first optical sensor 40. Further, the first control signal transducer 54 is connected to the second optical sensor 42 by way of a retardation member 68 or timing member 68 such that the second optical sensor 42 is switched on or activated with a time delay after the image recording of the first optical sensor 40 starts. The second control signal transducer 56 correspondingly provides the second control signal 60 which switches on the second measurement illumination 52 during the image recording by the second optical sensor 42.

Correspondingly, the second control signal transducer 46 is connected to the third optical sensor 64 by way of a second retardation member 70 or second timing member 70 such that the third optical sensor 64 is switched on or activated with a time delay after the image recording by the second optical sensor starts and recording the image by the third optical sensor 64 starts. Assigned to the third optical sensor 64 is a third control signal transducer 72, which provides a third control signal 74 and accordingly switches on the third measurement illumination 66 during the image recording by the third optical sensor 64. The third control signal transducer 72 may be connected accordingly via a further retardation member to a further optical sensor with measurement illumination.

By way of connecting the control signal transducers 54, 56, 72 via the retardation members 68, 70 to the respectively subsequent optical sensor 42, 64, it is possible to realize a series connection in which the individual optical sensors are activated with time offset and the corresponding measurement illumination is switched on. As a result, an optical measurement with an individual and ideal illumination is realizable with little technical outlay.

Figure 4B:
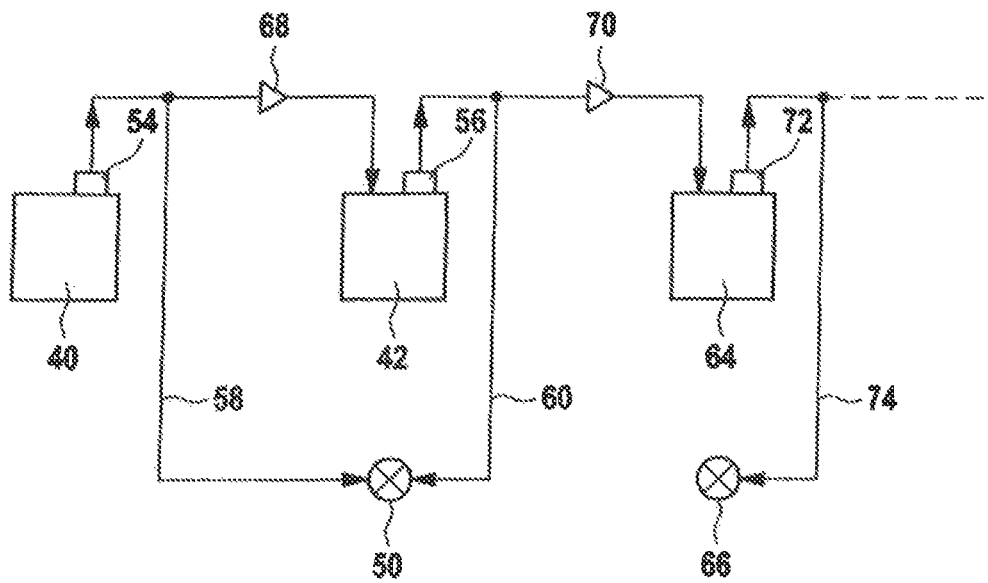

FIG. 4b depicts a schematic illustration of an embodiment of the control device for controlling the optical sensors and the measurement illumination from FIG. 4a.

In the embodiment depicted in FIG. 4b, the measuring apparatus 10 comprises the first optical sensor 40 and the second optical sensor 42, as well as the third optical sensor 64, with the image capturing region 44 and the object 12 to be measured being illuminated accordingly by the first measurement illumination 50 and the third measurement illumination 66 during the respective image recording by the correspondingly assigned optical sensors 40, 42, 64.

The first control signal transducer 54, which is assigned to the first optical sensor 40, provides the first control signal 58 which accordingly controls the first measurement illumination 50 during the image recording by the first optical sensor 40. Further, the first control signal transducer 54 is connected to the second optical sensor 42 by way of a retardation member 68 or timing member 68 such that the second optical sensor 42 is switched on or activated with a time delay after the image recording of the first optical sensor 40 starts. The second control signal transducer 56 correspondingly provides the second control signal 60 which likewise controls the first measurement illumination 50 during the image recording by the second optical sensor 42. The measurement illumination 50 may be controlled differently by the first control signal 58 and the second control signal 60 in order to obtain different illuminations.

Correspondingly, the second control signal transducer 46 is connected to the third optical sensor 64 by way of a second retardation member 70 or second timing member 70 such that the third optical sensor 64 is switched on or activated with a time delay after the image recording by the second optical sensor starts and recording the image by the third optical sensor 64 starts. Assigned to the third optical sensor 64 is the third control signal transducer 72, which provides the third control signal 74 and accordingly switches on the third measurement illumination 66 during the image recording by the third optical sensor 64. The third control signal transducer 72 may be connected accordingly via a further retardation member to a further optical sensor with measurement illumination.

Figure 4C:
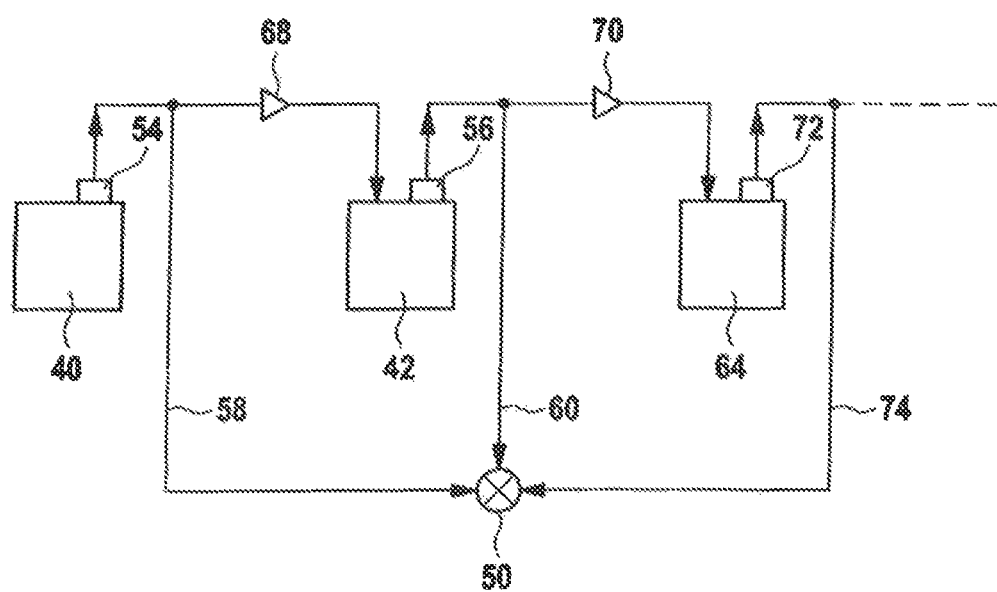

FIG. 4c depicts a schematic illustration of an embodiment of the control device for controlling the optical sensors and the measurement illumination from FIG. 4a.

In the embodiment depicted in FIG. 4c, the measuring apparatus 10 comprises the first optical sensor 40 and the second optical sensor 42 and the third optical sensor 64, with the image capturing region 44 and the object 12 to be measured being illuminated accordingly by the first measurement illumination 50 only during the respective image recording by the assigned optical sensors 40, 42, 64. The first measurement illumination 50 is controlled in different measurement illumination settings by the control signals 58, 60, 74 in order to illuminate the image capturing region in different settings.

In the control device in the form of a series connection, depicted in FIGS. 4a-c, the first optical sensor 40 is defined as a master which activates or triggers the further optical sensors 42, 64 accordingly by way of the retardation members 68, 70 and which introduces the image acquisition. As a result of such a series connection following the "daisy chain" principle, it is possible to connect any number of optical sensors in series for any number of image recordings from different directions, with all that needs to be ensured being that the integration time of the optical sensors 40, 42, 64, and hence the switching-on times of the measurement illuminations 50, 52, 66, or the different measurement illumination settings of the measurement illumination arrangement do not overlap.

By way of the retardation members 68, 70 or timing members 68, 70, it is possible to retard the control signals between the control signal transducers 54, 56, 72 and the optical sensors 42, 64 by any time interval t. The time interval t may be set in such a way that t>0 in order to retard the signal, or it may be set in such a way that t=0 and the signal is not retarded. Direct triggering of the optical sensors may be obtained as a result.

FIG. 5 depicts a schematic flowchart of a method for controlling the illumination of the measuring apparatus 10. In FIG. 5, the method is denoted generally by 80.

Initially, a first image recording time period is set in step 82, during which images are recorded in the image capturing region 44 by means of the first optical sensor 40. Hence, a start of the first image recording time period is known. At the same time, the duration of the image recording time period is set, and so the end of the image recording time period is likewise known.

The first control signal 58, which represents the first image recording time period, is provided in step 84. By way of example, it may be provided as a digital signal which outputs the signal "1" during the image recording of the first optical sensor and outputs the signal "0" outside of the image recording time period. Whether or not image recording by the first optical sensor 40 is taking place is always known as a result of this. This is followed by illuminating 86 the image capturing region 44 using the first measurement illumination 50 during the first image recording time period, depending on the first control signal 58. By way of example, if the control signal is switched to "1", the first measurement illumination 50 is also switched on. If the control signal switches back again, the first measurement illumination 50 is switched off. In this manner, the first measurement illumination 50 is switched on during the entire first image capturing region for the purposes of illuminating the image capturing region 44.

A second image recording time period, in which image recording is carried out by means of the second optical sensor 42, is set in step 88. Hence, a start of this second image recording time period is known. Further, the duration of the second image recording time period is known or set, and so the end thereof is likewise known. The second image recording time period is defined outside of the first image recording time period with regard to time and accordingly offset with regard to time such that the first image recording time period and the second image recording time period are spaced apart with regard to time. The start of the second image recording time period may be defined by way of the timing member 68 or the retardation member 68 and introduced in a manner accordingly dependent on the first control signal 58.

The second control signal 60 is provided by the second control signal transducer 56, said second control signal 60 representing the second image recording time period, in step 90. Like the first control signal, this second control signal may be provided e.g. as a digital signal which outputs the signal "1" during the image recording by the second optical sensor and outputs the signal "0" outside of the second image recording time period. Depending on the embodiment, the second control signal 60 is transferred to the first measurement illumination 50 or the second measurement illumination 52 and the first measurement illumination 50 or second measurement illumination 52 is switched in accordance with the control signal.

Depending on the second control signal, the image capturing region 44 is illuminated by the first measurement illumination 50 or second measurement illumination 52 in step 92. This ensures that the image capturing region 44 and, accordingly, the object 12 to be measured are only illuminated by the two specific measurement illuminations 50, 52 or measurement illumination settings during the respective image recording by the optical sensors 40, 42. This ensures that the object 12 to be measured is illuminated in a complete ideal fashion in each case and that there is no overdriving or are no dazzling effects.

In one embodiment of the method, the object 12 to be measured may be illuminated by e.g. an ambient illumination arrangement or else a marking illumination device within the scope of a further step in order to simplify setting up the measurement for the user and facilitate monitoring of the measurement. This illumination occurs outside of the first image recording time period and the second image recording time period with regard to time. Here outside with regard to time means offset with regard to time, i.e. before and/or after the first image recording time period and second image recording time period. The start of the illumination by the ambient illumination arrangement or marking illumination device may be coupled to one of the control signals 58, 60 by way of a timing member or retardation member. As a result, the matching of the individual illumination time periods and image capturing time periods with regard to time may be set with little technical outlay.

Figure 6A:
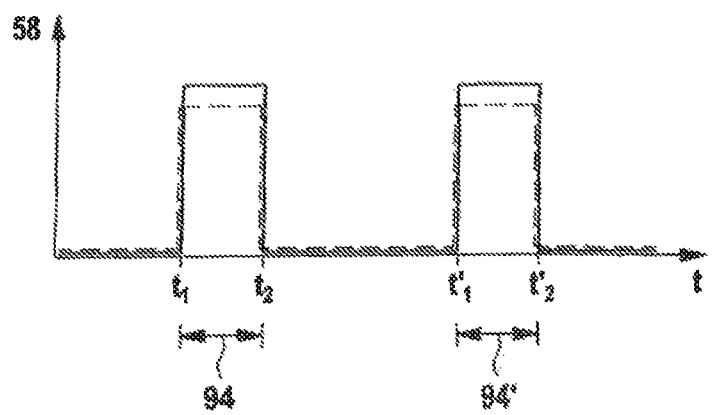
FIG. 6a shows a first timing diagram of different switching states in one embodiment.

FIG. 6a shows a timing diagram of an exemplary embodiment of the method 80.

The timing diagram from FIG. 6a shows the first image recording time period by the first optical sensor 40 and the corresponding illumination time period by the first measurement illumination 50.

The first control signal 58 (dashed line) represents the first image recording time period between t1 and t2, which is denoted generally by 94. FIG. 6a further depicts an illumination time period by the corresponding first measurement illumination 50 (full line), which represents the time period in which the first measurement illumination 50 is switched on and illuminates the image capturing region 40. The first measurement illumination time period corresponds to the image capturing time period 94 as the first measurement illumination 50 is controlled by the first control signal 58 of the first control signal transducer 54. As a result, the image capturing region 44 is illuminated substantially simultaneously with the image recording time period 94, wherein the measurement illumination time period may have a slight time offset as a result of the signal propagation time of the first control signal 58. By coupling the first illumination time period to the first image recording time period 94, it is possible to ensure that the image capturing region 44 is ideally illuminated during the image recording by the first optical sensor 40.

The second image recording time period of the second optical sensor 42 and the corresponding measurement illumination time period by the second measurement illumination 52 has a corresponding time offset, as explained in more detail below.

Figure 6B:
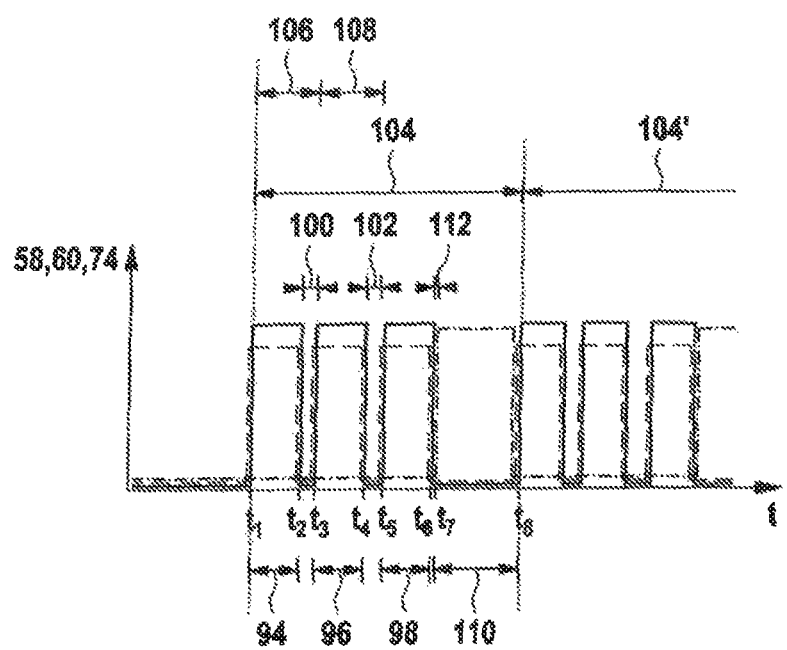
FIG. 6b shows a schematic illustration of the switching states in a further embodiment.

FIG. 6b depicts a timing diagram of a refinement of the method 80.

In this timing diagram, two further image recording time periods 96, 98 are depicted between the times t3, t4 and t5, t6 in addition to the first image recording time period 94, said further image recording time periods in each case being offset with regard to time and not overlapping with one another. The measurement illuminations 50, 52, 66 are accordingly switched on separately and individually during the respective image recording time periods 94, 96, 98 in order to illuminate the image capturing region 44 only by way of the respective measurement illumination 50, 52, 66 during the respective image recording time periods 94, 96, 98. The image recording time periods 94, 96, 98 are spaced apart by time intervals 100, 102, which are arranged accordingly between the image recording time periods 94, 96, 98. This ensures that there are no interferences with the image recording by the individual optical sensors 40, 42, 64.

The image capturing time periods 94, 96, 98 are formed within a refresh period 104 of the measuring apparatus 10 such that the optical sensors 40, 42, 64 accordingly in each case carry out one image recording during each refresh period 104.

The first image recording time period 94 is accordingly started at the time t1 with the start of each refresh period 104 and said first image recording time period forms an integration master, wherein the second image recording time period 96 is accordingly spaced apart by a retardation time 106 as a result of the timing member 68. Accordingly, the start of the third image recording time period 98 at the time t5 is spaced apart from the start of the second image recording time period at the time t3 by the retardation time 108 of the timing member 70. As a result, the image recording time periods 94, 96, 98 may be controlled with little outlay in a series connection in a manner offset with regard to time, as explained above. In the case of a repetition frequency of 30 Hz, the refresh period length 104 is approximately 33.3 ms.

A further illumination time period 110 is depicted (dash-dotted line) between the times t7 and t8 as an optional embodiment, i.e. after the third image recording time period 98 and before the end of the refresh period 104. As explained above, this further illumination time period 110 is e.g. an illumination by an ambient illumination arrangement or a marking illumination device for the purposes of illuminating or optically marking the image capturing region 44. The further illumination time period 110 is spaced apart from the third image recording time period 98 by a time interval 112 such that the ambient illumination arrangement or the marking illumination device does not interfere with the image recordings during the image recording time periods 94, 96, 98. It is understood that the further illumination time period 110 may be arranged at any position with regard to time within the refresh period 104, but accordingly spaced apart from the image recording time periods 94, 96, 98.

What is claimed is:

1. A measuring apparatus comprising:
    a first optical sensor for recording an image in an image capturing region during a first image recording time period;
    a first control signal transducer that provides a first control signal representing the first image recording time period;
    a measurement illumination arrangement for illuminating the image capturing region;
    a second optical sensor for recording an image in the image capturing region during a second image recording time period outside of the first image recording time period with regard to time;
    a second control signal transducer providing a second control signal representing the second image recording time period; and
    a control device,
    wherein the control device is configured to:
        control the measurement illumination arrangement during the first image recording time period in a manner dependent on the first control signal in accordance with a first measurement illumination setting and
        control the measurement illumination arrangement during the second image recording time period in a manner dependent on the second control signal in accordance with a second measurement illumination setting,
    wherein the second optical sensor is series connected to the first control signal transducer via a timing member for controlling the image recording of the second optical sensor with regard to time, and
    wherein the first control signal is supplied to the timing member so that the second optical sensor is triggered by the first optical sensor by way of the timing member.

2. The measuring apparatus according to claim 1, wherein:
    the measurement illumination arrangement comprises an individual measurement illumination and
    the control device is configured to control the individual measurement illumination in accordance with the first measurement illumination setting and the second measurement illumination setting.

3. The measuring apparatus according to claim 1, wherein:
    the measurement illumination arrangement comprises a first measurement illumination and a second measurement illumination and
    the control device is configured to switch on the first measurement illumination during the first measurement illumination setting and switch on the second measurement illumination during the second measurement illumination setting.

4. The measuring apparatus according to claim 3, wherein the control device is configured to:
    switch off the first measurement illumination at least during the second image recording time period with regard to time and
    switch off the second measurement illumination at least during the first image recording time period with regard to time.

5. The measuring apparatus according to claim 3, wherein the control device is configured to:
    switch off the first measurement illumination outside of the first image recording time period with regard to time and
    switch off the second measurement illumination outside of the second image recording time period with regard to time.

6. The measuring apparatus according to claim 3, wherein:
    the first control signal transducer controls the first measurement illumination and
    the second control signal transducer controls the second measurement illumination.

7. The measuring apparatus according to claim 1, further comprising:
    a third optical sensor for recording an image in the image capturing region during a third image recording time period outside of the first image recording time period and the second image recording time period with regard to time and
    a third control signal transducer that provides a third control signal representing the third image recording time period and controls the measurement illumination arrangement for illuminating the image capturing region, wherein the third optical sensor is connected to the second control signal transducer by a timing member for the purposes of controlling the image recording of the third optical sensor with regard to time.

8. The measuring apparatus according to claim 1, wherein the control device furthermore is configured to switch on at least one further illumination arrangement outside of the image recording time periods with regard to time in a manner dependent on one of the control signals.

9. The measuring apparatus according to claim 8, wherein the further illumination arrangement is a marking illumination device for marking the image capturing region.

10. A method for controlling illumination for a measuring apparatus including at least two optical sensors for recording an image in an image capturing region, the method comprising the following steps:

setting a first image recording time period, during which images are recorded in the image capturing region by a first optical sensor;

providing a first control signal representing the first image recording time period;

illuminating the image capturing region using a measurement illumination arrangement of the measuring apparatus during the first image recording time period in accordance with a first measurement illumination setting depending on the first control signal;

setting a second image recording time period, during which images are recorded in the image capturing region by a second optical sensor;

providing a second control signal representing the second image recording time period; and illuminating the image capturing region using the measurement illumination arrangement of the measuring apparatus during the second image recording time period in accordance with a second measurement illumination setting depending on the second control signal, wherein the second image recording time period starts offset by a first time interval after an end of the first image recording time period, wherein the first optical sensor triggers the second optical sensor by providing the first control signal to the second optical sensor by a series connection via a timing member providing the offset by the first time interval.

11. The method according to claim 10, wherein an individual measurement illumination of the measurement illumination arrangement is controlled in accordance with the first measurement illumination setting and the second measurement illumination setting.

12. The method according to claim 10, wherein:
a first measurement illumination of the measurement illumination arrangement is switched on during the first measurement illumination setting and
a second measurement illumination is switched on during the second measurement illumination setting.

13. The method according to claim 12, wherein:
the first measurement illumination arrangement is switched off outside of the first image recording time period and
the second measurement illumination arrangement is switched off outside of the second image recording time period.

14. The method according to claim 10, wherein a sum of the image recording time periods is less than a period length of a refresh of the measuring apparatus.

15. The method according to claim 10, wherein:
the image capturing region is illuminated by a further illumination arrangement outside of the first image recording time period and second image recording time period with regard to time and
illumination by the further illumination arrangement starts offset with regard to time after an end of one of the image recording time periods and ends before a start of a further image recording time period.

16. A non-transitory computer readable storage medium containing a computer program that, when the computer program is executed by a controller of a measuring apparatus, performs a method for controlling illumination for the measuring apparatus, the measuring apparatus including at least two optical sensors for recording an image in an image capturing region, the method comprising the following steps:

setting a first image recording time period, during which images are recorded in the image capturing region by a first optical sensor;

providing a first control signal representing the first image recording time period;

illuminating the image capturing region using a measurement illumination arrangement of the measuring apparatus during the first image recording time period in accordance with a first measurement illumination setting depending on the first control signal;

setting a second image recording time period, during which images are recorded in the image capturing region by a second optical sensor;

providing a second control signal representing the second image recording time period; and illuminating the image capturing region using the measurement illumination arrangement of the measuring apparatus during the second image recording time period in accordance with a second measurement illumination setting depending on the second control signal, wherein the second image recording time period starts offset by a first time interval after an end of the first image recording time period, wherein the first optical sensor triggers the second optical sensor by providing the first control signal to the second optical sensor by a series connection via a timing member providing the offset by the first time interval.

* * * * *